(12) United States Patent
Henry et al.

(10) Patent No.: US 6,385,716 B1
(45) Date of Patent: May 7, 2002

(54) METHOD AND APPARATUS FOR TRACKING COHERENCE OF DUAL FLOATING POINT AND MMX REGISTER FILES

(75) Inventors: G. Glenn Henry, Austin; Albert J. Loper, Jr., Cedar Park, both of TX (US)

(73) Assignee: IP-First, L.L.C., Fremont, CA (US)

( * ) Notice: Subject to any disclaimer, the term of this patent is extended or adjusted under 35 U.S.C. 154(b) by 0 days.

(21) Appl. No.: 09/349,441

(22) Filed: Jul. 9, 1999

(51) Int. Cl.[7] .............................................. G06F 12/12
(52) U.S. Cl. ....................... 712/222; 711/156
(58) Field of Search .................. 712/222; 714/54; 711/156, 165, 210, 141

(56) References Cited

U.S. PATENT DOCUMENTS

| | | | | |
|---|---|---|---|---|
| 5,907,842 A | * | 5/1999 | Mennemeier | 707/7 |
| 5,978,901 A | * | 11/1999 | Luedtke | 712/222 |
| 6,145,049 A | * | 11/2000 | Wong | 710/267 |
| 6,339,823 B1 | * | 1/2002 | Loper | 712/222 |

OTHER PUBLICATIONS http://developer.intel.com/drg/mmx/manuals/dg/dg_chp1.htm , and dg_chp2.htm. "Introduction to the Intel Architecture MMX Technology Developer's Manual" dated Nov. 18, 1997.

* cited by examiner

Primary Examiner—Eric Coleman
(74) Attorney, Agent, or Firm—E. Alan Davis; James W. Huffman

(57) ABSTRACT

An apparatus and method for tracking coherence between distinct floating point and MMX register files in a microprocessor is provided. The apparatus keeps track of the last time a floating point or MMX instruction was translated and what the instruction type of that previous instruction was by storing the previous instruction type in a register. When the current instruction is translated, the translator compares the current instruction type with the previous instruction type stored in the register to determine if they are different, i.e., if an instruction boundary (a change from MMX to floating point instruction or vice versa) was encountered. If so, the translator generates a signal to indicate that the two register files may be incoherent and need to be made consistent again.

21 Claims, 6 Drawing Sheets

Floating Point Register File

MMX Register File

MMX Register File
Aliased Onto
Floating Point Register File

FIG. 3

| | | |
|---|---|---|
| MOVQ | MM0, [ESI] | ; load 8 bytes from memory into MMX register 0 |
| EMMS | | ; empty multimedia state |
| | | ; this constitutes an instruction boundary, i.e., a change<br>; from execution of an MMX instruction to a FP<br>; instruction or vice versa |
| FINIT | | ; initialize FP stack pointer to point to FP7 |
| | | ; this does not constitute an instruction boundary since<br>; it is not a change from execution of an MMX<br>; instruction to a FP instruction or vice versa;<br>; this is a change from a FP instruction to an integer<br>; instruction |
| ADD | ECX, 8 | ; this is a non-FP and non-MMX instruction |

METHOD AND APPARATUS FOR TRACKING COHERENCE OF DUAL FLOATING POINT AND MMX REGISTER FILES

BACKGROUND OF THE INVENTION

1. Field of the Invention

This invention relates in general to the field of microprocessors providing MMX™ instructions, and more particularly to register file coherence in such microprocessors.

2. Description of the Related Art

The Intel Architecture™ (IA) originally provided integer instructions that operate on a set of integer registers referred to collectively as an integer register file. Early IA processors were complemented by external floating point processors, such as the 80287™ and 80387™ processors, which execute floating point instructions. These floating point processors included their own floating point register file, also referred to as the floating point register stack due to the manner in which floating point instructions reference individual registers within the floating point register file. In particular, the x87 architecture includes 8×80-bit floating point registers 100, as shown in FIG. 1A. With the advent of the 80486™, the floating point unit was integrated into the processor itself along with the floating point register file.

Finally, the Pentium™ provided media enhancement technology, otherwise known as MMX instructions. These instructions provide enhanced performance for operations typically performed in multimedia applications, such as video and audio calculations. The MMX instructions operate on an 8×64-bit MMX register file 200, as shown in FIG. 1B. However, for compatibility reasons discussed below, the 8 MMX registers are mapped, or aliased, onto the 8 floating point registers 300, as shown in FIG. 2. That is, from a programming perspective, the floating point and MMX register files comprise the same registers. Thus, a write of a value by an MMX instruction to register MM6 followed by a read by a floating point instruction of register FP6 would yield the value written by the MMX instruction.

The main reason for the design decision not to provide an architecturally separate MMX register file was to maintain compatibility with existing IA architecture operating systems, such as UNIX™, OS/2™ or Windows™. When performing task switches, these operating systems must save the state of the processor, which includes saving to memory the contents of both the integer and floating point register files. The addition of an architecturally distinct MMX register file would require the undesirable modification of already existing operating systems.

One result of the evolution of the 1A described above is that programmers have developed certain conventions that they follow when developing software applications that employ floating point or MMX instructions. One convention is to mix floating point and MMX instructions only at the module or procedure level and to avoid mixing them at the instruction level. That is, programmers typically will code an entire procedure or module using only MMX (and integer instructions) without floating point instructions, or vice versa, rather than mixing MMX and floating point instructions in the same procedure. A switch from a floating point to an MMX instruction, or vice versa, is referred to as an instruction boundary. Thus, applications programmers typically attempt to minimize the number of instruction boundaries in their software applications.

A second convention is to leave all the floating point registers empty at the end of a section of floating point code (i.e., the tag bits of the floating point registers indicate they are empty), such as at the end of a floating point procedure. A third convention is similar to the second: leaving all the MMX registers empty at the end of an MMX procedure. The third convention is typically accomplished via the EMMS (empty multimedia state) instruction. FIG. 3 shows a sample segment of source code illustrating an instruction boundary and use of the EMMS instruction. FIG. 3 will be described in more detail below in the discussion of FIG. 7.

As discussed previously, the MMX and floating point units of an IA microprocessor share the floating point register file architecturally. However, connecting both a floating point 402 and an MMX unit 404 to floating point register file 300, as shown in FIG. 4, is costly in terms of wiring within a microprocessor 400, potentially resulting in an increase in the number of layers required for implementation. Therefore, it has been observed that including a physically distinct MMX register file 502, as shown in FIG. 5 which is transparent to the programmer may provide some cost and performance advantages.

However, including a separate transparent MMX register file creates a problem. As discussed above, the IA requires the floating point and MMX registers programmatically to occupy the same space. Therefore, coherence, i.e., consistency of content, between the floating point and MMX register files must be maintained. As stated above, if an MMX instruction writes a value to MM6 and a subsequent floating point instruction reads FP6, the same value must be returned as was written.

One way to achieve this coherence is to write to both register files on each write operation, regardless of whether the write instruction is a floating point or MMX instruction. However, this solution is disadvantageous in that it may require a larger amount of power and result in lower performance than simply writing to the specified register set.

Therefore, what is needed is an improved method and apparatus for tracking the coherence between the floating point and MMX register files that takes advantage of the conventions adopted by software application programmers.

SUMMARY

To address the above-detailed deficiencies, it is an object of the present invention to provide a method and apparatus for tracking coherence between distinct floating point and MMX register files in a microprocessor. Accordingly, in the attainment of the aforementioned object, it is a feature of the present invention to provide an apparatus that detects instruction boundaries between floating point and MMX instructions in a program executed by a microprocessor having distinct floating point and MMX register files. The apparatus includes a storage element that stores a previous instruction type indicating whether a previous instruction was a floating point instruction or an MMX instruction and an instruction translator coupled to the storage element. The translator receives an instruction, generates a current instruction type indicating if the instruction is a floating point instruction or an MMX instruction and compares the current instruction type with the previous instruction type. If the current instruction type and the previous instruction type are not the same, then the translator generates a signal indicating that the floating point and MMX register files are incoherent.

An advantage of the present invention is that it enables the microprocessor to have distinct floating point and MMX register files and yet maintain coherence between them. Another advantage of the present invention is that it enables the microprocessor to restore coherence between the distinct register files only upon encountering an instruction boundary between floating point and MMX instruction, a condition that typically occurs relatively infrequently.

In another aspect, it is a feature of the present invention to provide a microprocessor that tracks coherence between its distinct floating point and MMX register files. The microprocessor includes a floating point register file coupled to a floating point unit and an MMX register file coupled to an MMX unit. The microprocessor also includes a storage element that stores a previous instruction type indicating whether a previous instruction was a floating point instruction or an MMX instruction and an instruction translator coupled to the storage element and to the floating point and MMX units. The translator receives an instruction, generates a current instruction type indicating if the instruction is a floating point instruction or an MMX instruction and compares the current instruction type with the previous instruction type. If the current instruction type and the previous instruction type are not the same, then the translator generates a signal indicating that the floating point and MMX register files are incoherent.

In yet another aspect, it is a feature of the present invention to provide a method for tracking coherence between distinct floating point and MMX register files within a microprocessor. The method includes storing a previous instruction type indicating whether a previous instruction was a floating point instruction or an MMX instruction, translating an instruction after storing the previous instruction type, generating a current instruction type indicating if the instruction is a floating point instruction or an MMX instruction in response to translating the current instruction and comparing the current instruction type with the previous instruction type after generating the current instruction type. The method further includes generating a signal indicating that the floating point and MMX register files are incoherent if the current instruction type and the previous instruction type are not the same when compared.

BRIEF DESCRIPTION OF THE DRAWINGS

These and other objects, features, and advantages of the present invention will become better understood with regard to the following description, and accompanying. drawings where:

FIG. 3 is sample source code illustrating an instruction boundary between MMX and floating point instructions.

DETAILED DESCRIPTION

Figure 1A:
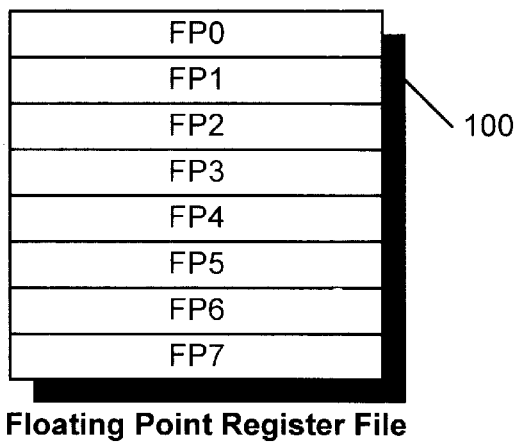
FIG. 1A is a prior art block diagram illustrating the floating point register file of an IA microprocessor.
Figure 1B:
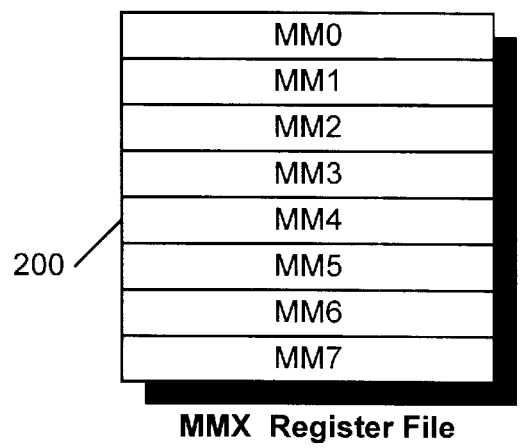
FIG. 1B is a prior art block diagram illustrating the MMX register file of an IA microprocessor.
Figure 2:
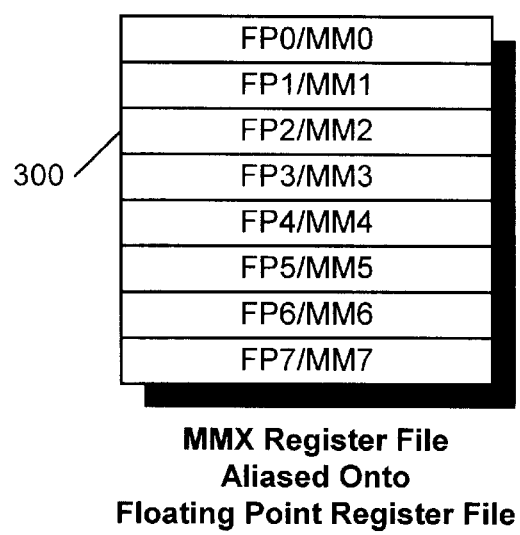
FIG. 2 is a prior art block diagram illustrating the MMX register file of an IA microprocessor mapped onto the floating point register file.
Figure 4:
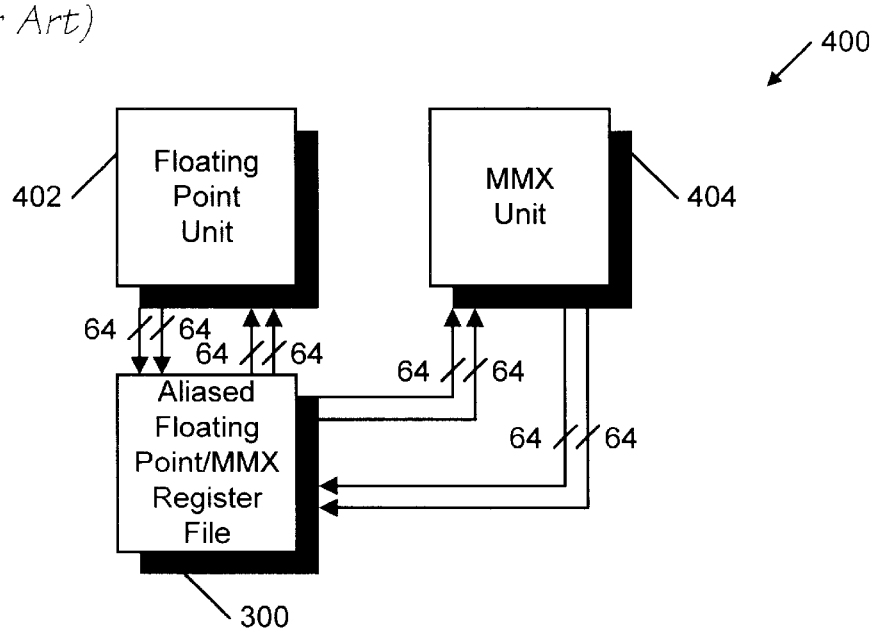
FIG. 4 is a prior art block diagram illustrating the connection of a floating point unit and an MMX unit to the floating point register file.
Figure 5:
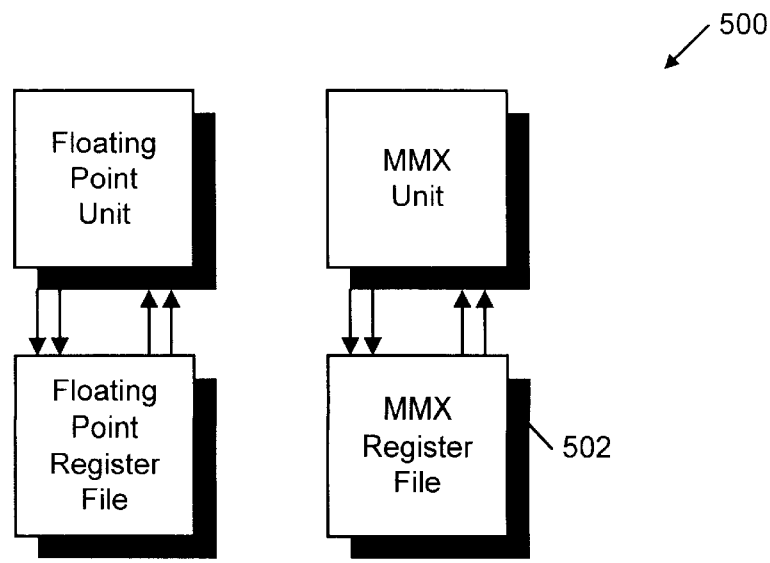
FIG. 5 is a block diagram illustrating portions of a microprocessor including an MMX register file, distinct from the floating point register file, coupled directly to an MMX unit according to the present invention.
Figure 6:
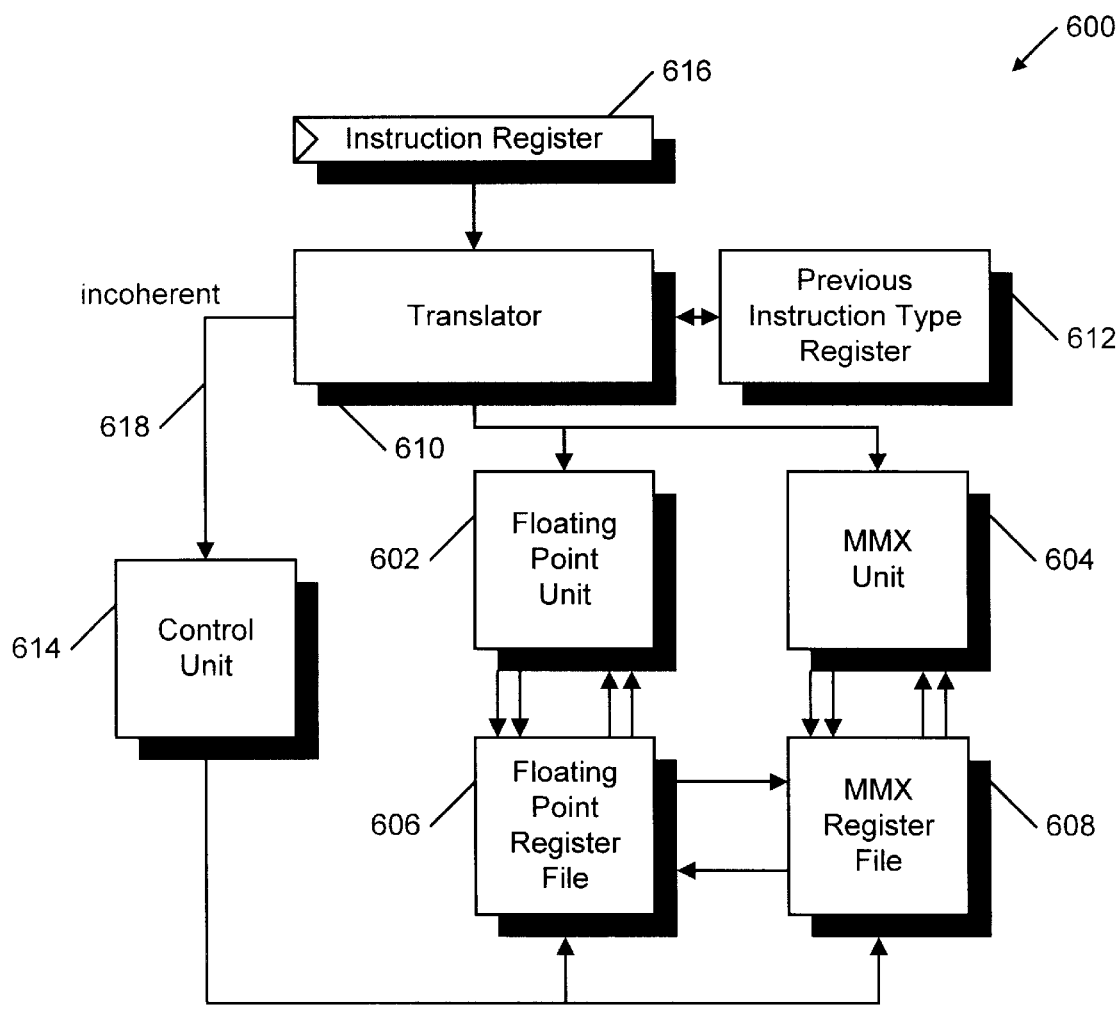
FIG. 6 is a block diagram illustrating an apparatus for tracking coherence between the floating point and MMX register files of the microprocessor of FIG. 5 according to the present invention.

Referring to FIG. 6, a block diagram of portions of a microprocessor 600 according to the present invention is shown. The microprocessor 600 includes a floating point unit 602 and an MMX unit 604. The floating point unit 602 executes floating point instructions and the MMX unit 604. executes MMX instructions.

The microprocessor 600 further includes a floating point register file 606 coupled to the floating point unit 602 and an MMX register file 608 coupled to the MMX unit 604. The floating point unit 602 performs operations on registers within the floating point register file 606 and the MMX unit 604 performs operations on registers within the MMX register file 608.

In the embodiment shown, the floating point register file 606 and MMX register file 608 are coupled together to facilitate the transfer of data between the two register files in order to maintain coherence between them. However, other embodiments are contemplated in which the floating point register file 606 and the MMX register file 608 are not directly coupled together. Instead, registers are updated by indirect transfer of data, such as by using integer registers (not shown) of the microprocessor 600 as temporary storage locations. The restoring of coherence between the two register files is described in more detail below with respect to FIG. 8.

The microprocessor 600 further includes an instruction register 616. The microprocessor 600 loads the next instruction to be translated, such as an MMX, floating point or integer (i.e., non-MMX and non-floating point) instruction, into the instruction register 616.

The instruction register 616 is coupled to a translator 610. The translator 610 receives the next instruction to be translated from the instruction register 616 and translates, or decodes, the instruction. In particular, the translator 610 determines if the instruction is an MMX or floating point instruction. If the instruction is a floating point instruction the translator 610 provides the instruction to the floating point unit 602 and if the instruction is an MMX instruction the translator 610 provides the instruction to the MMX unit 604. Otherwise, the translator 610 provides the instruction to an integer unit (not shown).

The translator 610 is also coupled to a previous instruction type register 612. The previous instruction type register 612 stores an indication of whether the previous instruction translated was an MMX or floating point instruction. That is, when the translator 610 determines if the instruction is an MMX or floating point instruction the translator 610 stores a value into the previous instruction type register 612 indicating the instruction type. Preferably, the previous instruction type register 612 comprises a single bit register wherein one binary value indicates an MMX instruction and the other binary value indicates a floating point instruction.

However, prior to storing the instruction type into the previous instruction type register 612, the translator 610 compares the contents of the previous instruction type register 612 with the instruction type of the current instruction to determine if the previous and current instruction are of different types. That is, the translator 610 determines whether the previous instruction was an MMX instruction and the current instruction is a floating point instruction or vice versa. In other words, the previous instruction type register 612 enables the translator 610 to detect an instruction boundary in the instruction sequence.

If the previous and current instruction types are different, i.e., if an instruction boundary has been encountered, then the translator 610 generates an incoherent signal 618 to indicate that the floating point register file 606 and the MMX register file 608 are potentially incoherent. That is, the incoherent signal 618 indicates that an instruction boundary has been encountered resulting in a potential condition where the two register sets are not consistent in their contents.

The microprocessor 600 further includes a control unit 614 coupled to the floating point register file 606 and the MMX register file 608. The control unit 614 includes logic to receive the incoherent signal 618 and restore coherence between the two register files in response to the incoherent signal 618. The control unit 614 copies register contents from the floating point register file 606 to the MMX register file 608, or vice versa, as necessary to restore coherence.

Figure 7:
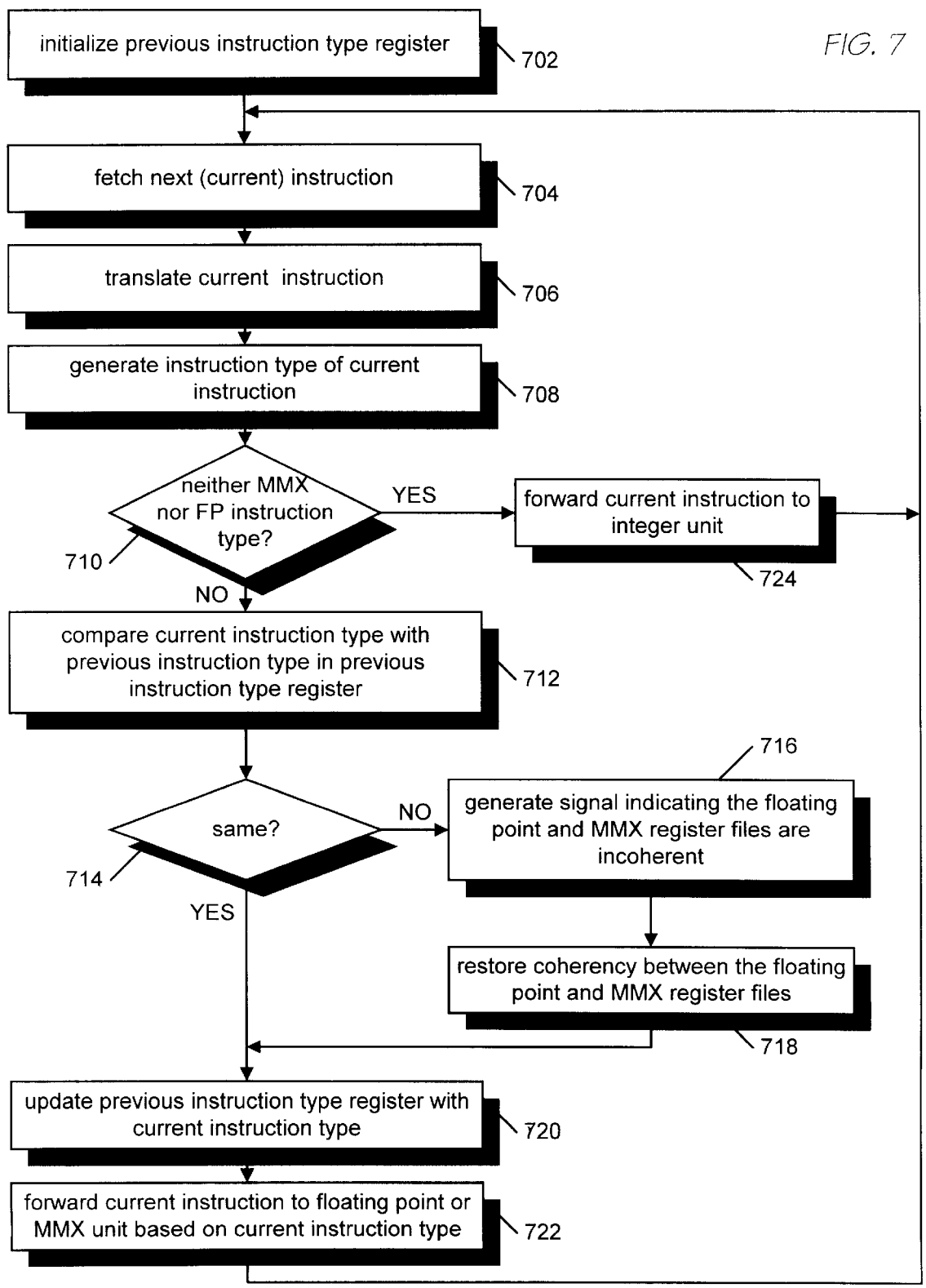
FIGS. 7 and 8 are flow charts illustrating steps executed by the microprocessor of FIG. 6 to track coherence between the floating point and MMX register files according to the method of the present invention.

Referring now to FIG. 7, a flow chart illustrating steps executed by the microprocessor 600 of FIG. 6 according to the method of the present invention is shown. The microprocessor 600 initializes the previous instruction type register 612 to a predetermined value, in step 702. The microprocessor 600 then fetches an instruction, which becomes the current instruction, and places the instruction into the instruction register 616, in step 704. The translator then receives the current instruction from the instruction register 616 and translates the current instruction, in step 706.

Next, the translator 610 determines if the current instruction is an MMX or floating point instruction and generates a value indicating the current instruction type, in step 708. If the translator 610 determines that the current instruction type is neither an MMX nor a floating point instruction, e.g., an integer instruction, in step 710, then the translator 610 forwards the current instruction to the integer unit (not shown) of the microprocessor 600, in step 724 and then fetches the next instruction, in step 704. In particular, if the translator 610 determines that the current instruction type is neither an MMX nor a floating point instruction, then the translator 610 takes no action with respect to the coherence of the register files. That is, the translator 610 does not update the previous instruction type register 612 and does not generate an indication on the incoherent signal 618 that the register files are incoherent.

However, if the translator 610 determines that the current instruction type is either an MMX or a floating point instruction, in step 710, then the translator 610 compares the current instruction type with the previous instruction type contained in the previous instruction type register 612, in step 712. The translator 610 then determines if the current instruction type and the previous instruction type are the same, in step 714.

If the current instruction type and the previous instruction type are not the same, then the translator 610 generates an indication on the incoherent signal 618 that an instruction boundary has occurred and that potential incoherence exists between the floating point register file 606 and the MMX register file 608, in step 716. In response to the incoherent signal 618, the control unit 614 restores coherence between the floating point register file 606 and the MMX register file 608, in step 718. Step 718 is described in more detail in FIG. 8.

If the current instruction type and the previous instruction type are the same or once coherence between the two register files is restored, the translator 610 updates the previous instruction type register 612 with the value of the current instruction type, in step 720. The translator 610 then selectively forwards the current instruction to the floating point unit 602 or MMX unit 604 as appropriate based upon the current instruction type, in step 722, and then returns to step 704 to fetch the next instruction.

Figure 8:
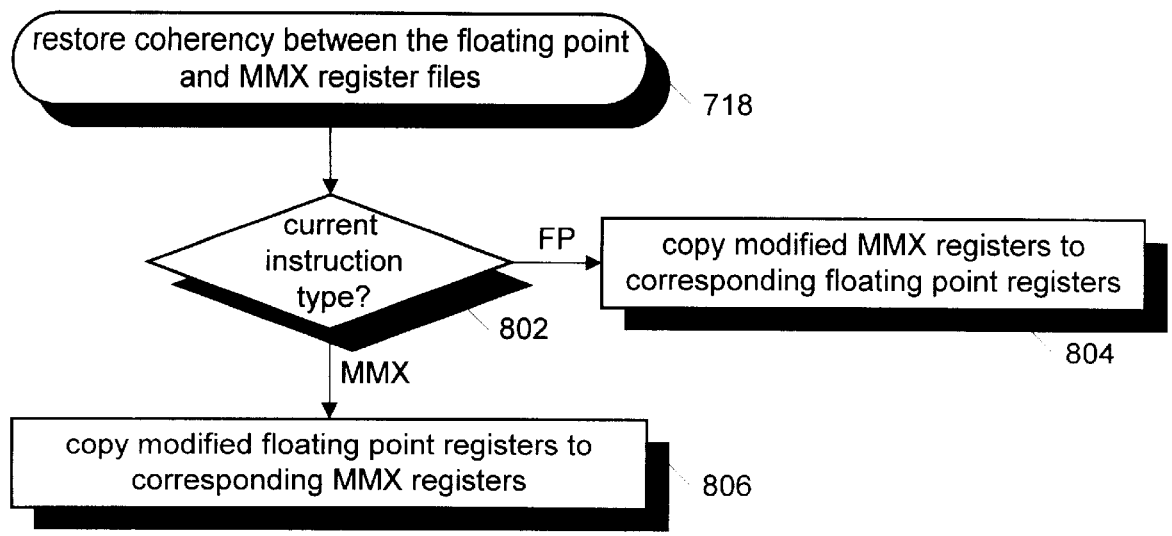

Referring now to FIG. 8, a flow chart illustrating in more detail step 718 of FIG. 7 according to the method of the present invention is shown. The control unit 614 determines if the current instruction type is a floating point instruction type or an MMX instruction type, in step 802. If the current instruction type is a floating point instruction type, then the control unit 614 copies the contents of any registers in the MMX register file 608 which have been modified since the last time the two register files were coherent to its corresponding register in the floating point register file 606, in step 804.

Conversely, if the current instruction type is an MMX instruction type, then the control unit 614 copies the contents of any registers in the floating point register file 606 which have been modified since the last time the two register files were coherent to its corresponding register in the MMX register file 608, in step 806.

Referring again to FIG. 3, a description will be given of steps taken by the microprocessor 600 of FIG. 6 according to the steps of FIGS. 7 and 8 to execute the code of FIG. 3. The microprocessor 600 fetches the MOVQ instruction in step 704, the translator 610 translates it in step 706 and generates an MMX instruction type in step 708 since the MOVQ is an MMX instruction.

The translator 610 determines that the MOVQ is an MMX instruction in step 710 and compares the current instruction type, which is MMX, with the previous instruction type in the previous instruction type register 612, in step 712. Let us assume in the example that the previous instruction was of type MMX. Therefore, the translator 610 determines that the current and previous instruction types are the same, in step 714, and accordingly does not generate the incoherent signal 618, but instead updates the previous instruction type register 612 with the value corresponding to the MMX instruction type, in step 720 and forwards the MOVQ instruction to the MMX unit, in step 722.

Next, the microprocessor 600 fetches the EMMS instruction in step 704, the translator 610 translates it in step 706 and generates an MMX instruction type in step 708 since the EMMS is an MMX instruction.

The translator 610 determines that the EMMS is an MMX instruction in step 710 and compares the current instruction type, which is MMX, with the previous instruction type in the previous instruction type register 612, in step 712. The translator 610 determines that the current and previous instruction types are the same, in step 714, since the MOVQ was of type MMX, and accordingly does not generate the incoherent signal 618, but instead updates the previous instruction type register 612 with the value corresponding to the MMX instruction type, in step 720 and forwards the EMMS instruction to the MMX unit, in step 722.

Next, the microprocessor 600 fetches the FINIT instruction in step 704, the translator 610 translates it in step 706 and generates a floating point instruction type in step 708 since the FINIT is a floating point instruction.

The translator 610 determines that the FINIT is a floating point instruction in step 710 and compares the current instruction type, which is floating point, with the previous instruction type in the previous instruction type register 612, in step 712. The translator 610 determines that the current and previous instruction types are different, in step 714, since the EMMS was of type MMX and the FINIT is of type floating point. That is, the translator 610 detects an instruction boundary. Consequently, the translator 610 generates the incoherent signal 618 to indicate potential incoherence between the floating point register file 606 and the MMX register file 608, in step 716. The control unit 614 then restores coherence between the two register files in response to the incoherent signal 618, in step 718. The translator 610 then updates the previous instruction type register 612 with the value corresponding to the floating point instruction type, in step 720 and forwards the FINIT instruction to the floating point unit, in step 722.

Next, the microprocessor 600 fetches the ADD instruction in step 704, the translator 610 translates it in step 706 and generates an integer instruction type in step 708 since the ADD is an integer instruction.

The translator 610 determines that the ADD is an integer instruction, i.e., neither an MMX nor a floating point instruction, in step 710. Consequently, the translator 610 forwards the ADD instruction to the integer unit, in step 724 and does not compare the current instruction type with the previous instruction type nor updates the previous instruction type register 612. This operation advantageously avoids consuming valuable clock cycles performing operations to make the floating point register file 606 and MMX register file 608 coherent unnecessarily simply because an integer instruction appears in the instruction stream.

As the foregoing detailed description illustrates, the microprocessor 600 advantageously detects instruction boundaries between floating point and MMX instructions and only restores coherence between the two register files upon detection of such an instruction boundary.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. An apparatus for tracking coherence between floating point and MMX register files, comprising:

a storage element configured to store a previous instruction type indicating whether a previous instruction was a floating point instruction or an MMX instruction; and an instruction translator coupled to said storage element configured to receive a current instruction, to generate a current instruction type indicating if said current instruction is a floating point instruction or an MMX instruction, to compare said current instruction type with said previous instruction type and to generate a signal indicating that the floating point and MMX register files are incoherent if said current instruction type and said previous instruction type are not the same.

2. The apparatus of claim 1, wherein said translator is further configured to update said previous instruction type in said storage element with said current instruction type after comparing said current instruction type with said previous instruction type.

3. The apparatus of claim 1, further comprising a control unit coupled to said signal and the floating point and MMX register files configured to restore coherence between the floating point and MMX register files when said signal indicates the floating point and MMX register files are incoherent.

4. The apparatus of claim 3, wherein said control unit restores said coherence by copying at least a portion of said floating point register file to said MMX register file if said instruction is an MMX instruction.

5. The apparatus of claim 3, wherein said control unit restores said coherence by copying at least a portion of said MMX register file to said floating point register file if said instruction is a floating point instruction.

6. The apparatus of claim 1, wherein said translator is configured to compare said current instruction type with said previous instruction type only if said current instruction is an MMX instruction or a floating point instruction.

7. A microprocessor, comprising:

a floating point register file coupled to a floating point unit;

an MMX register file coupled to an MMX unit;

a storage element configured to store a previous instruction type indicating whether a previous instruction was a floating point instruction or an MMX instruction; and an instruction translator coupled to said storage element and said floating point and MMX units configured to receive an instruction, to generate a current instruction type indicating if said current instruction is a floating point instruction or an MMX instruction, to compare said current instruction type with said previous instruction type and to generate a signal indicating that the floating point and MMX register files are incoherent if said current instruction type and said previous instruction type are not the same.

8. The microprocessor of claim 7, wherein said translator is further configured to update said previous instruction type in said storage element with said current instruction type after comparing said current instruction type with said previous instruction type.

9. The microprocessor of claim 7, further comprising a control unit coupled to said signal and the floating point and MMX register files configured to restore coherence between the floating point and MMX register files when said signal indicates the floating point and MMX register files are incoherent.

10. The microprocessor of claim 9, wherein said control unit restores said coherence by copying at least a portion of said floating point register file to said MMX register file if said instruction is an MMX instruction.

11. The microprocessor of claim 9, wherein said control unit restores said coherence by copying at least a portion of said MMX register file to said floating point register file if said instruction is a floating point instruction.

12. The microprocessor of claim 7, further comprising an instruction register configured to provide said instruction to said translator.

13. The microprocessor of claim 7, wherein said translator is further configured to selectively provide said current instruction to said floating point unit or said MMX unit in response to said current instruction type.

14. The microprocessor of claim 7, wherein said translator is configured to compare said current instruction type with said previous instruction type only if said current instruction is an MMX instruction or a floating point instruction.

15. A method for tracking coherence between floating point and MMX register files in a microprocessor, comprising:

storing a previous instruction type indicating whether a previous instruction was a floating point instruction or an MMX instruction;

translating a current instruction after said storing;

generating a current instruction type indicating if said current instruction is a floating point instruction or an MMX instruction in response to said translating;

comparing said current instruction type with said previous instruction type after said generating said current instruction type; and generating a signal indicating that the floating point and MMX register files are incoherent if said current instruction type and said previous instruction type are not the same.

16. The method of claim 15, further comprising updating said previous instruction type in said storage element with said current instruction type after said comparing.

17. The method of claim 15, further comprising restoring coherence between the floating point and MMX register files in response to said generating said signal if said current instruction type and said previous instruction type are not the same.

18. The method of claim 17, wherein said restoring comprises copying at least a portion of said floating point register file to said MMX register file if said current instruction is an MMX instruction.

19. The method of claim 17, wherein said restoring comprises copying at least a portion of said MMX register file to said floating point register file if said current instruction is a floating point instruction.

20. The method of claim 15, further comprising selectively providing said current instruction to a floating point unit if said current instruction is a floating point instruction or to an MMX unit if said current instruction is an MMX instruction after said translating.

21. The method of claim 15, further comprising performing said comparing only if said current instruction is a floating point instruction or an MMX instruction.

* * * * *